(12) United States Patent
Gupta et al.

(10) Patent No.: US 9,906,604 B2
(45) Date of Patent: Feb. 27, 2018

(54) SYSTEM AND METHOD FOR DYNAMIC DISCOVERY OF WEB SERVICES FOR A MANAGEMENT CONSOLE

(71) Applicant: DELL PRODUCTS L.P., Round Rock, TX (US)

(72) Inventors: Chitrak Gupta, Bangalore (IN); Abhirup Seal, West Bengal (IN); Lucky Pratap Khemani, Bangalore (IN); Hari Venkatachalam, Bangalore (IN); Sushma Basavarajaiah, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 389 days.

(21) Appl. No.: 14/642,380

(22) Filed: Mar. 9, 2015

(65) Prior Publication Data
US 2016/0269492 A1 Sep. 15, 2016

(51) Int. Cl.
G06F 17/30 (2006.01)
H04L 29/08 (2006.01)

(52) U.S. Cl.
CPC ........ H04L 67/16 (2013.01); G06F 17/30115 (2013.01); G06F 17/30292 (2013.01); G06F 17/30864 (2013.01); H04L 67/306 (2013.01)

(58) Field of Classification Search
CPC ... H04L 67/16; H04L 67/306; H04L 41/0273; G06F 17/30115; G06F 17/30292; G06F 17/30864
USPC ......... 707/705, 736, 803; 709/217, 227, 230
See application file for complete search history.

(56) References Cited

U.S. PATENT DOCUMENTS

| 7,987,163 | B2 | 7/2011 | Keshavarz-Nia et al. |
| 8,583,699 | B2 | 11/2013 | Dettinger et al. |
| 8,706,879 | B2 | 4/2014 | Sparks |
| 9,317,843 | B2* | 4/2016 | Bradley ............. G06Q 20/1235 |
| 2005/0021348 | A1* | 1/2005 | Chan .................... G06Q 10/067 706/45 |
| 2005/0240354 | A1* | 10/2005 | Mamou ............. G06F 17/30563 702/19 |
| 2006/0089929 | A1* | 4/2006 | Morikawa ............. H04L 67/025 |
| 2006/0277606 | A1* | 12/2006 | Yunus ..................... G06F 21/51 726/25 |
| 2007/0073753 | A1* | 3/2007 | Baikov ................. G06F 9/4435 |
| 2009/0157419 | A1* | 6/2009 | Bursey ................. G06Q 10/101 705/346 |
| 2009/0307190 | A1* | 12/2009 | Maresca ................. G06F 9/543 |
| 2010/0070448 | A1* | 3/2010 | Omoigui ............. H01L 27/1463 706/47 |
| 2011/0184990 | A1* | 7/2011 | Murphy .................... G06F 8/20 707/791 |
| 2011/0231473 | A1 | 9/2011 | Narayanan et al. |
| 2011/0296404 | A1 | 12/2011 | Zhang et al. |

(Continued)

Primary Examiner — Hares Jami
(74) Attorney, Agent, or Firm — Baker Botts L.L.P.

(57) ABSTRACT

A system and method for dynamic discovery of web services for a management console is disclosed. The method includes detecting, at a discovery module of a service processor, a profile request from a console application. The method further includes requesting class information for the detected profile request from a provider register, and generating a profile-based web services description language (WSDL) file. The method also includes communicating the profile-based WSDL file to the console application.

20 Claims, 5 Drawing Sheets

(56) References Cited

U.S. PATENT DOCUMENTS

| | | | |
|---|---|---|---|
| 2012/0117160 A1* | 5/2012 | Bickson | H04L 67/02 709/206 |
| 2012/0158416 A1* | 6/2012 | Brunswig | G06Q 10/10 705/1.1 |
| 2013/0007428 A1 | 1/2013 | Khosrowpour et al. | |
| 2013/0332605 A1 | 12/2013 | Kozlowski et al. | |

* cited by examiner

SYSTEM AND METHOD FOR DYNAMIC DISCOVERY OF WEB SERVICES FOR A MANAGEMENT CONSOLE

TECHNICAL FIELD

This disclosure relates generally to information handling systems, and more particularly, to systems and methods for dynamic discovery of web services for a management console.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Systems management of multiple information handling systems may be accomplished by use of a management console, also referred to as a "console," with access to service processors (e.g., a chassis management controller (CMC) for a chassis that houses multiple information handling systems and/or an Integrated Dell Remote Access Controller (iDRAC) for individual information handling systems). Web services management (WSMan) is used extensively by consoles for remote access control and to access service processors for systems management. WSMan is system management protocol that supports web services and allows groups of information handling systems and network based services to collaborate. However, the infrastructure provided for users to generate code to manage such systems is not user-friendly. Generally, much of the information needed by a user of a console is stored at a remote server (for example, a Universal Description, Discovery and Integration (UDDI) server) without proper mapping. For example, Managed Object Format (MOF) bundles for different generations, web services description language (WSDL) bundles for different generations, and profile files that may not be used for applications and programming are generally stored at a remote service. The MOF bundles may be converted by a WSDL generation tool during software build. The MOF bundles and WSDL bundles may be stored by a vendor with limited access by a console user and/or MOF bundles may be stored in a managed system services repository (MASER) partition also with limited access. Further, for each new release of remote access control or service processor firmware, the MOF and WSDL bundles are updated along with the stored vendor files and the console.

Currently, class information, such as common information model (CIM) class information, is provided to the console applications. A computing system that supports the CIM may include a CIM object manager (CIMOM), which provides an interface between CIM providers and management applications. Classes may represent controllable features of a program and may establish associations between multiple instances of device classes. However, console users have to separately access the profile files for class information, such as CIM profiles. Profiles are self-contained models that can be used for generating specific artifacts during software development. Profiles are typically the starting point for development of applications by console users. As such, current systems exhibit issues in maintenance and distribution of information needed for application development by console users and current systems fail to provide dynamic views of profiles.

SUMMARY

In some embodiments, a method includes detecting, at a discovery module of a service processor, a profile request from a console application. The method further includes requesting class information for the detected profile request from a provider register, and generating a profile-based web services description language (WSDL) file. The method also includes communicating the profile-based WSDL file to the console application.

In another embodiment, a system includes a service processor configured to detect a profile request from a console application. The service processor is also configured to request class information for the detected profile request from a provider register, and generate a profile-based WSDL file. The service processor is further configured to communicate the profile-based WSDL file to the console application.

In a further embodiment, a non-transitory computer-readable medium is disclosed that includes instructions that, when executed by a processor, cause the processor to detect a profile request from a console application. The processor is further caused to request class information for the detected profile request from a provider register, and generate a profile-based WSDL file. The processor is also caused to communicate the profile-based WSDL file to the console application.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
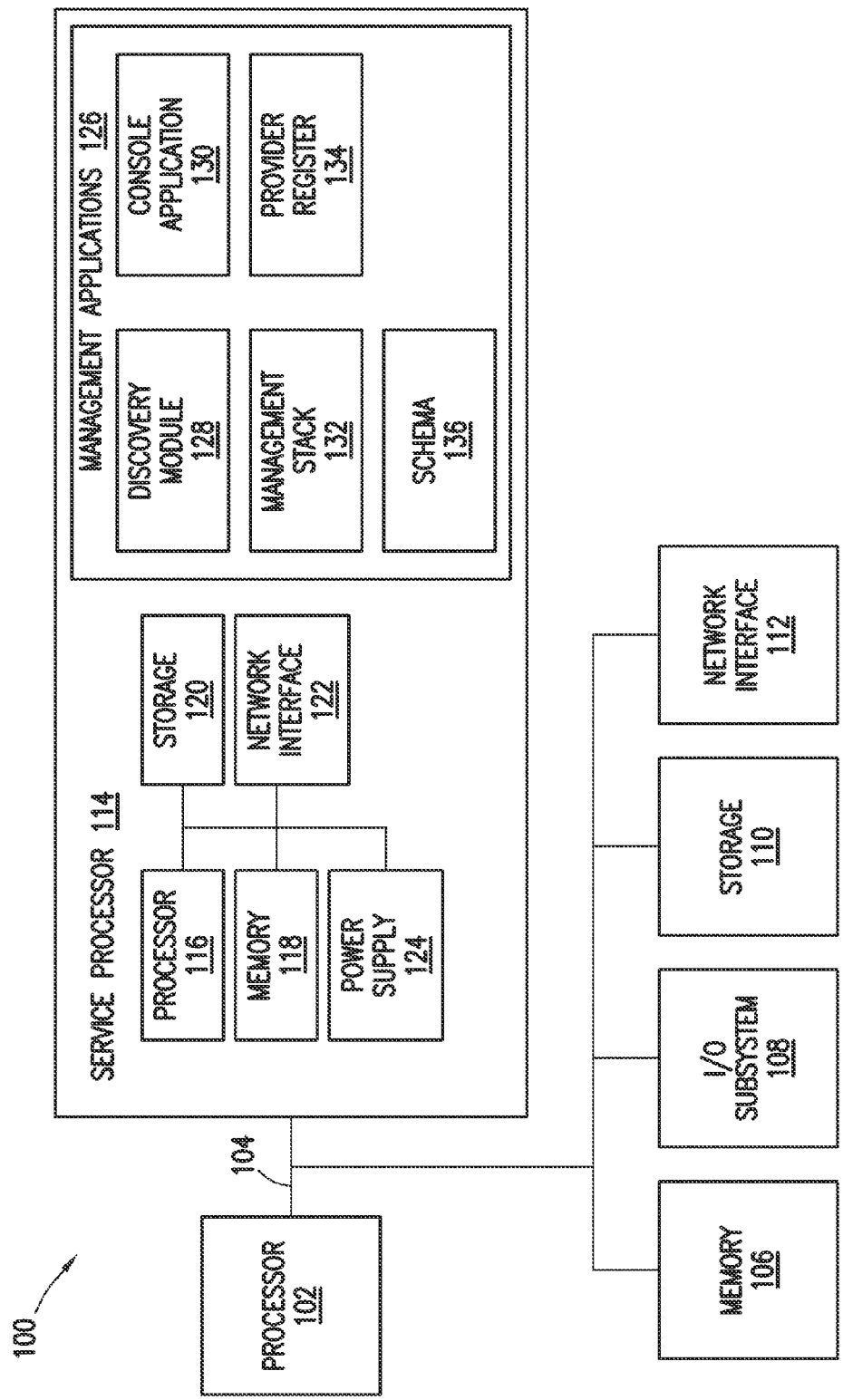
FIG. 1 illustrates a block diagram of selected elements of an embodiment of an information handling system in accordance with some embodiments of the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element collectively. Thus, for example, device "12-1" refers to an instance of a device class, which may be referred to collectively as devices "12" and any one of which may be referred to generically as a device "12".

As noted previously, profiles are generally the starting point for application development. Web services management (WSMan) is used extensively by console applications for remote access control and to access service processors for systems management. In some embodiments, the present disclosure provides a dynamic method for profile based discovery by a console application, also referred to as a "management console." The present disclosure defines a profile-based web services description language (WSDL) model that may define a complete profile. Such a profile-based WSDL model may provide console applications with a profile view in place of a class view. Providing a profile view to users of console applications may facilitate development of applications to inventory, monitor and configure managed devices and management of information handling systems via chassis management controllers (CMCs) and/or access controllers resident on the information handling systems. In some embodiments, the mapping of the WSDL model may be directly linked with the compiled class schema, and hence dynamic. In some embodiments, because of this direct link, the profile-based WSDL model may minimize or eliminate maintenance and updates of the Managed Object Format (MOF) bundles and WSDL bundles. In some embodiments, the profile-based WSDL model being created dynamically may further minimize or eliminate the need for vendor storage and distribution of profiles via third-party discovery servers, such as Universal Description, Discovery and Integration (UDDI) servers. The profile-based WSDL file may be created upon request by a user, and thus, there may be no need to store and distribute the compact WSDL by a vendor.

In some embodiments, a management stack, such as a WSMan stack, is integrated with a discovery module at a service processor. Using the management stack, the console application queries a discovery module with the WSMan stack for a single or multiple profiles of interest. The discovery module may create an internal table to look-up information in a provider register. For example, the discovery module may map the provider register file with the common interface model (CIM)-schema database. After receiving the profile name, the discovery module performs a look-up in the provider register and then queries the class information for the identified profile name. The discovery module also queries the CIM-schema database to retrieve information about the class properties and extrinsic methods. The discovery module correlates the classes that are present in the particular profile of interest. The classes may be called individually and processed into a profile-based WSDL file. The discovery module may return the profile-based WSDL file to the console application.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1, 2, 3, 4, and 5, wherein like numbers are used to indicate like and corresponding parts.

FIG. 1 illustrates a block diagram of selected elements of an embodiment of information handling system 100 in accordance with some embodiments of the present disclosure. As described herein, information handling system 100 may represent a server, a server blade, a storage device, a redundant array of independent disks (RAID) controller, a personal computing device, such as a personal computer system, a desktop computer, a laptop computer, a notebook computer, etc., operated by a user. In various embodiments, information handling system 100 may be operated by the user using a keyboard and a mouse (not shown). Components of information handling system 100 may include, but are not limited to, processor 102, which may comprise one or more processors, and system bus 104 that communicatively couples various system components to processor 102 including, for example, memory 106, I/O subsystem 108, storage 110, network interface 112, and service processor 114. Although this disclosure describes and illustrates a particular information handling system having a particular number of particular components in a particular arrangement, this disclosure contemplates any suitable information handling system having any suitable number of any suitable components in any suitable arrangement.

Processor 102 may comprise any system, device, or apparatus operable to interpret and/or execute program instructions and/or process data. Processor 102 may include one or more microprocessors, microcontrollers, digital signal processors (DSPs), graphical processing units (GPUs), application specific integrated circuits (ASICs), or another digital or analog circuitry configured to interpret and/or execute program instructions and/or process data. In some embodiments, processor 102 may interpret and/or execute program instructions and/or process data stored locally (e.g., in memory 106). In the same or alternative embodiments, processor 102 may interpret and/or execute program instructions and/or process data stored remotely (e.g., in a network storage resource, not shown). This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

System bus 104 includes hardware, software, or both coupling components of information handling system 100 to each other. System bus 104 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. System bus 104 may be configured to communicatively couple components of information handling system 100. Although this disclosure describes and illustrates a particular bus, this disclosure contemplates any suitable bus or interconnect.

Memory 106 may comprise a system, device, or apparatus operable to retain and/or retrieve program instructions and/or data for a period of time (e.g., computer-readable media). Memory 106 may comprise one or more modules, such modules can include random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Although this disclosure describes and illustrates particular memory, this disclosure contemplates any suitable memory.

In information handling system 100, I/O subsystem 108 may comprise a system, device, or apparatus generally operable to receive and/or transmit data to/from/within information handling system 100. I/O subsystem 108 may represent, for example, a variety of communication interfaces, graphics interfaces, video interfaces, user input interfaces, and/or peripheral interfaces. For example, I/O subsystem 108 may comprise a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces for them. Where appropriate, I/O subsystem 108 may include one or more device or software drivers enabling processor 102 to drive one or more of these I/O devices. Although this disclosure describes and illustrates a particular I/O subsystem, this disclosure contemplates any suitable I/O subsystem.

Storage 110 includes mass storage for data or instructions and may comprise computer-readable media. As an example and not by way of limitation, storage 110 may include a hard disk drive (HDD), a floppy disk drive, flash memory, an optical disc, a magneto-optical disc, magnetic tape, or a Universal Serial Bus (USB) drive or a combination of two or more of these. Storage 110 may include removable or non-removable (or fixed) media, where appropriate. Storage 110 may be internal or external to information handling system 100, where appropriate. In particular embodiments, storage 110 is non-volatile, solid-state memory. In particular embodiments, storage 110 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 110 taking any suitable physical form. Storage 110 may include one or more storage control units facilitating communication between processor 102 and storage 110, where appropriate. Although this disclosure describes and illustrates particular storage, this disclosure contemplates any suitable storage.

Network interface 112 may be a suitable system, apparatus, or device operable to serve as an interface between information handling system 100 and a network. Network interface 112 includes hardware, software, or both providing one or more interfaces for communication (such as, for example, packet-based communication) between information handling system 100 and one or more other information handling systems 100 or one or more networks. As an example and not by way of limitation, network interface 112 may include a network adapter for communicating with an Ethernet or other wire-based network or a wireless NIC (WNIC) or wireless adapter for communicating with a wireless network, such as a WI-FI network. Network interface 112 may enable information handling system 100 to communicate over a network using a suitable transmission protocol and/or standard, including, but not limited to various transmission protocols and/or standards. In some embodiments, network interface 112 may be communicatively coupled via a network to a network storage resource (not shown). A network coupled to network interface 112 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). A network may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network and/or various components associated therewith may be implemented using hardware, software, or any combination thereof. Although this disclosure describes and illustrates a particular network interface, this disclosure contemplates any suitable network interface.

Service processor 114 may be any system, device, apparatus or component of information handling system 100 configured to permit an administrator or other person to remotely or locally monitor and/or remotely or locally manage information handling system 100 regardless of whether information handling system 100 is powered on and/or has an operating system installed thereon. In certain embodiments, service processor 114 may allow for out-of-band control of information handling system 100, such that communications to and from service processor 114 are communicated via a management channel physically isolated from the "in band" communication with network interface 112. Thus, for example, if a failure occurs in information handling system 100 that prevents an administrator from remotely accessing information handling system 100 via network interface 112 (e.g., operating system failure, power failure), the administrator may still be able to monitor and/or manage the information handling system 100 (e.g., to diagnose problems that may have caused failure) via service processor 114. In the same or alternative embodiments, service processor 114 may allow an administrator to remotely or locally manage one or more parameters associated with operation of information handling system 100 (e.g., power usage, processor allocation, memory allocation, security privileges, etc.). In certain embodiments, service processor 114 may include or may be a Baseboard Management Controller (BMC), a Chassis Management Controller (CMC), a Management Engine (ME), or an integral part of a Dell Remote Access Controller (DRAC), or an Integrated Dell Remote Access Controller (iDRAC), which are systems management hardware and software solutions operable to provide remote management capabilities.

Service processor 114 may include processor 116 communicatively coupled to memory 118, storage 120, network interface 122, power source 124, and management applications 128. Processor 116 may include any system, device, or apparatus configured to interpret and/or execute program instructions and/or process data, and may include, without limitation a microprocessor, microcontroller, DSP, ASIC, or any other digital or analog circuitry configured to interpret and/or execute program instructions and/or process data. In some embodiments, processor 116 may interpret and/or execute program instructions and/or process data stored in memory 118 and/or another component of information handling system 100. In some embodiments, processor 116 may be similar to processor 102.

Memory 118 of service processor 114 may include any system, device, or apparatus configured to retain program instructions and/or data for a period of time (e.g., computer-readable media). By way of example without limitation, memory 118 may include RAM, EEPROM, a PCMCIA card, flash memory, magnetic storage, opto-magnetic storage, or any suitable selection and/or array of volatile or non-volatile memory that retains data after power to information handling system 100 is turned off or power to service processor 114 is removed. In some embodiments, memory 118 may be similar to memory 106.

Storage 120 of service processor 114 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. In some embodiments, storage resource 120 may be similar to storage 110.

Network interface 122 of service processor 114 may include any suitable system, apparatus, or device operable to serve as an interface between service processor 114 and a network. Network interface 122 may enable service processor 114 to communicate over a network using any suitable transmission protocol and/or standard, including without limitation all transmission protocols and/or standards enumerated above with reference to the discussion of network interface 112. In some embodiments, network interface 122 may be similar to network interface 112.

Power source 124 of service processor 114 may be any suitable power supply, such as a battery. Power source 124 may be dedicated to service processor 114 to provide power to service processor 114 if no power is supplied to information handling system 100.

Management applications 126 may include any hardware, software, or firmware configured to provide local or remote management services to one or more information handling systems 100. Management applications 126 may include discovery module 128, console application 130, management stack 132, provider register 134, schema 136, and/or any other suitable components or modules. Management applications 116 may be stored in memory 106 or 120, storage 110 or 122, and/or any other suitable component of information handling system 100. Further, some or all of management applications 116 may be executed by processor 102 or 118, and/or any other suitable component of information handling system 100.

Discovery module 128 may be configured to receive profile requests from console application 130 and transmit profile information back to console application 130. Discovery module 128 may be further configured to query schema 136 and/or provider register 134 for information regarding classes, profiles, or any other suitable information. Discovery module 128 may be operable to convert files from one format to another, such as from a common manageability programming interface (CMPI) binary structure into an aggregated profile-based WSDL file.

Console application 130 may be configured to allow local or remote management of service processor 114. Console application 130 may be configured to determine profiles of interest and query discovery module 128 and/or management stack 132 for a single or multiple profiles of interest.

Management stack 132 may be a module or controller that may communicate to other components of information handling system 100 and/or a network. For example, management stack 132 may be a WSMan stack and may include a management application with a simple, standard interface such as WSMan. WSMan is a specification of a Simple Object Access Protocol (SOAP)-based protocol for the management of servers, devices, applications and more. SOAP is a protocol specification for exchanging structured information in computer networks.

Provider register 134 may be configured to include a listing, table, database or any other suitable structure for data. In some embodiments, provider register 134 may include implemented classes; class type, such as instance method or instance association; namespace for each class; and the profile to which each class belongs. Such a structure may enable implementation of provider-per-profile queries in place of a provider-per-class queries. As example, the format of provider register 134 may be as follows:

```

[DCIM_SystemEnumeration]
    provider: DCIMSYSINFO
    location: dcimsysinfo
    type: instance
    namespace: root/dcim

[DCIM_SystemManagementService]
    provider: DCIMSYSINFO
    location: dcimsysinfo
    type: instance method
    namespace: root/dcim

[DCIM_CLPServiceAffectsIdentity]
    provider: DCIMSIMP
    location: dcimsimp
    type: instance association
    namespace: root/dcim

[DCIM_SPHostedSIMPService]
    provider: DCIMSIMP
    location: dcimsimp
    type: instance association
    namespace: root/dcim
    [DCIM_SystemManagmentService]
```

Schema 136 may be configured to be any organizational database that maintains information. For example, schema 136 may be a Common Information Model (CIM)-Schema. CIM provides a standardized model of an information handling system to which all vendors and developers could adhere in the design of applications. The CIM-Schema defines and organize common and consistent semantics for networking and computing equipment, and services. The CIM-Schema supplies a set of classes with properties and associations that provide a well-understood conceptual framework within which it is possible to organize the available information about the managed environment. A CIM profile defines the CIM model and associated behavior for a particular implementation and is based on the CIM classes, associations, indications, methods and properties. Schema 136 may further be configured to include a CIM object manager (CIMOM), which provides an interface between CIM providers and management applications. Although described with reference to a CIM-schema, schema 136 may be a database using any suitable protocol based on the implementation.

In particular embodiments, one or more information handling systems 100 perform one or more steps of one or more methods described or illustrated herein. In particular embodiments, one or more information handling systems 100 provide the functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

Modifications, additions, or omissions may be made to the systems described herein without departing from the scope of the disclosure. For example, information handling system 100 may include any number of processors 102, busses 104, memories 106, I/O subsystems 108, storages 110, network interfaces 112, and service processors 114. The components may be integrated or separated. Moreover, the operations may be performed by more, fewer, or other components. Additionally, the operations may be performed using any suitable logic comprising software, hardware, and/or other logic.

Figure 2:
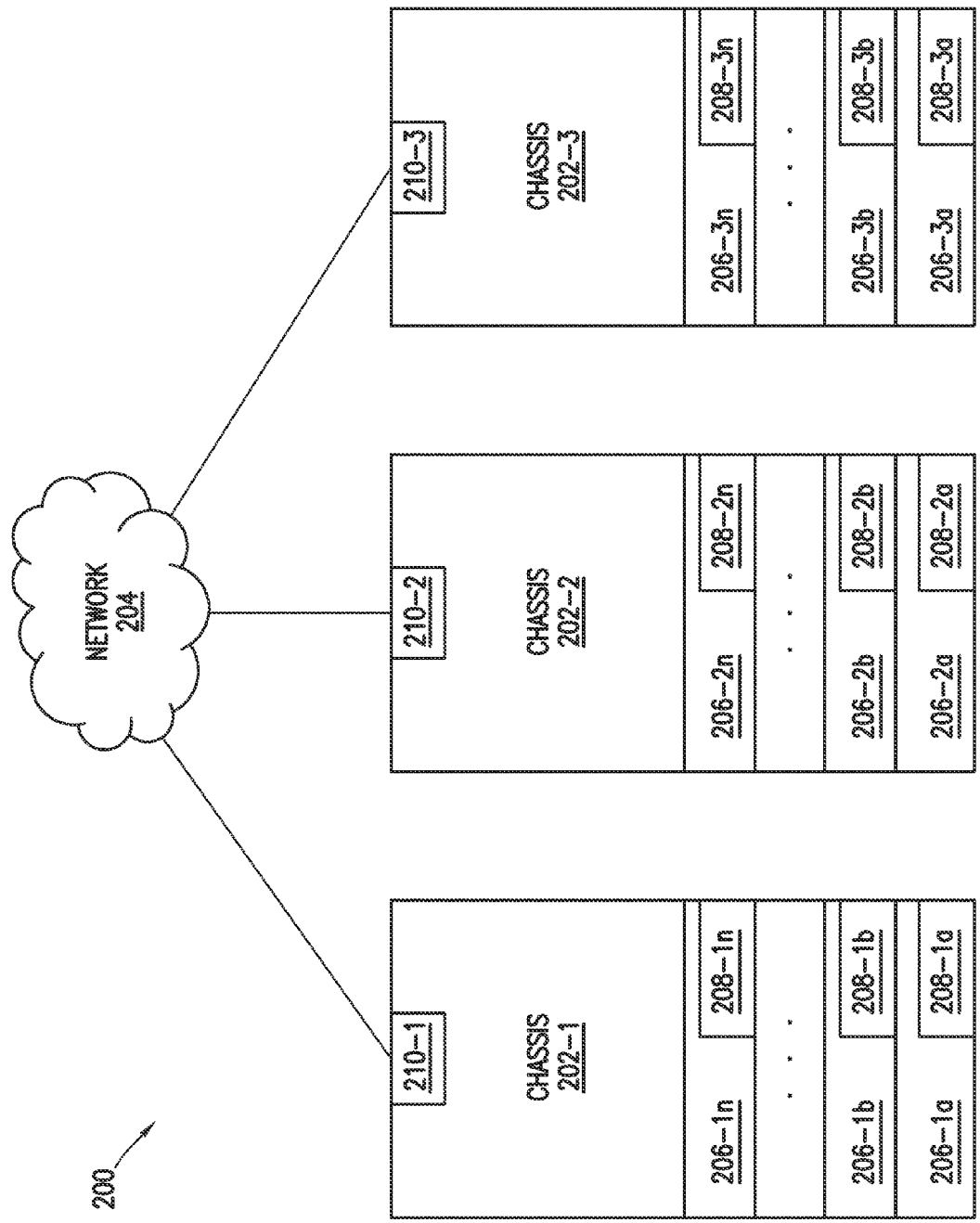
FIG. 2 illustrates a block diagram of an exemplary system in accordance with some embodiments of the present disclosure.

FIG. 2 illustrates a block diagram of system 200 in accordance with some embodiments of the present disclosure. In some embodiments, system 200 may include one or more chassis 202 communicatively coupled to one or more networks 204. Each chassis 202 may include one or more nodes 206 having one or more service processors 208, which may communicate via network 204. In some embodiments, each chassis 202 may include one or more service processors 210 that may be configured as chassis management controllers (CMCs). Service processors 208 and 210 may communicate via network 204 or any other suitable network. Nodes 206, service processors 208 and 210, and other components of system 200 may be configured as information handling systems 100, discussed with reference to FIG. 1.

Chassis 202 may be any physical structure utilized to support modular information handling systems, also referred to as blades, blade servers, computing nodes, sleds, etc., and referred to herein as nodes 206. Chassis 202 may include a plurality of nodes 206 and service processors 208 and 210, which may communicate via network 204. Chassis 202 may be stand-alone or may be installed in a rack with multiple other chassis 202. Nodes 206 included in chassis 202 may be installed by plugging in to corresponding backplane chassis slots. Chassis 202 may support a plurality (i.e., 8, 16, 32, etc.) of nodes 206. Although FIG. 2 depicts three chassis 202 and multiple nodes 206, system 200 may include any number of chassis 202 that may be configured to house a larger or smaller number of nodes 206 than are depicted. For example, chassis 202-1, 202-2 and 202-3 may be blade server chassis configured to house multiple blades as nodes 206. As such, chassis 202-1 may include nodes 206-1*a* through 206-1*n*.

Nodes 206 may be similar to information handling system 100 discussed with reference to FIG. 1. As shown in FIG. 1, each of nodes 206 may include one or more components (e.g., processor 102, memory 106, storage 108, I/O subsystem 110, network interface 112, and/or service processor 114). Nodes 206 may be included in groups based on similar configurations, functions, or other suitable characteristics.

Service processor 208 may be any system, device, apparatus or component of node 206 configured to permit an administrator or other person to remotely or locally monitor and/or remotely or locally manage nodes 206, regardless of whether nodes 206 are powered on and/or h an operating system installed thereon. In certain embodiments, service processor 208 may allow for out-of-band control of nodes 206, such that communications to and from service processor 208 are communicated via a management channel physically isolated from the "in band" communication with a network interface. Thus, for example, if a failure occurs in node 206 that prevents an administrator from remotely accessing node 206 via a network interface (e.g., operating system failure, power failure), the administrator may still be able to monitor and/or manage node 206 (e.g., to diagnose problems that may have caused failure) via service processor 208. In the same or alternative embodiments, service processor 208 may allow an administrator to remotely manage one or more parameters associated with operation of node 206 (e.g., power usage, processor allocation, memory allocation, security privileges, etc.). In certain embodiments, service processor 208 may include or may be an integral part of a Dell Remote Access Controller (DRAC), or an Integrated Dell Remote Access Controller (iDRAC), which are systems management hardware and software solutions operable to provide remote management capabilities. In addition, service processor 208 may be configured similar to service processor 114 discussed with reference to FIG. 1.

Service processor 210 may be included in chassis 202. For example, chassis 202-1, 202-2, and 202-3 may include service processors 210-1, 210-2, and 210-3, respectively. Each of service processors 210 may be coupled to other service processors 210 and other information handling systems by network 204. Service processor 210 may be implemented using any suitable device, system, or apparatus configured to monitor and/or manage one or more aspects of system 200. For example, service processor 210 may be a DELL POWEREDGE M1000e CHASSIS MANAGEMENT CONTROLLERS or a DELL POWERCONNECT W-6000 CONTROLLER. Service processor 210 may be configured to issue commands and/or other signals to manage and/or control system 200 and/or components of system 200. In some embodiments, service processor 210 may be configured to receive notifications from nodes 206 or be configured to detect when a change has occurred in one of nodes 206. A change in nodes 206 may include adding a node, removing a node, replacing a node, updating the firmware of a node or of one of its components, updating the configuration of a node or of one of its components, and any other suitable alteration of a node that affects system 200. In some embodiments, nodes 206 send event notifications to service processor 210 when a change occurs. The event notification may notify service processor 210 that a change occurred, what change occurred, provide configuration information of the changed node, or provide any suitable information regarding the change. Configuration information can include one or more of lists of components, lists of versions of software, lists of versions of firmware of one or more components, or any other suitable information describing how a node or its components are configured.

Network 204, in some embodiments, may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 204 and its various components may be implemented using hardware, software, or any combination thereof. Network 204 is configured such that any service processor 210 may communicate with or access information from service processor 210, and/or nodes 206 that may include a service processor, such as service processor 208. Although FIG. 2 illustrates one network 204, it should be understood that any number of networks may be included.

Figure 3:
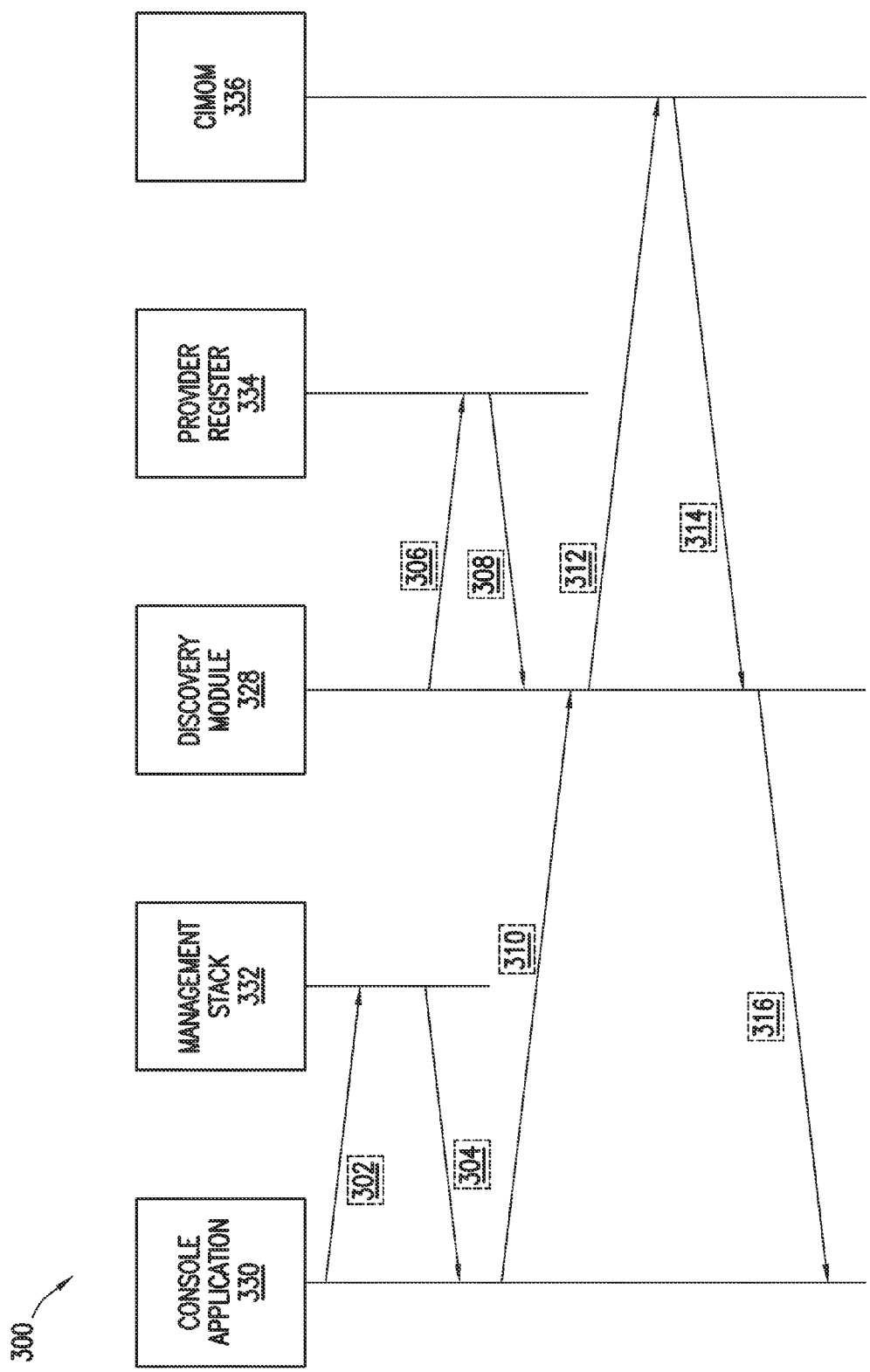
FIG. 3 illustrates an exemplary data flow between management applications in accordance with some embodiments of the present disclosure.

FIG. 3 illustrates an exemplary data flow 300 between management applications in accordance with some embodiments of the present disclosure. In some embodiments, data flow 300 may be performed with service processors 208 and/or 210 discussed with reference to FIG. 2, and/or service processor 114 discussed with reference to FIG. 1. Any of data flow 300 may be configured to occur within or be associated with any processor, memory, storage or any other resource or component. Further, any interprocess communication mechanism may be utilized to accomplish any portion of data flow 300, including queries and transmissions. Data flow 300 may be configured to occur in a service processor associated with a chassis, as discussed with reference to FIG. 2, or to occur in a service processor associated with an individual information handling system, as discussed with reference to FIG. 1.

In some embodiments, console application 330 may send query 302 to management stack 332 for supported profile information. Query 302 may be a Profile Registration Provider (PRP) query. Management stack 332 may return transmission 304 that includes a supported profile list. Discovery module 328 may continuously or periodically request a provider register map via request 306 to provider register 334. Provider register 334 includes implemented classes; class type, instance, method or association; name space of each class; and the profile to which each class belongs. Provider register 334 may return an internal lookup table including class information via transmission 308.

In operation, console application 330 may determine which of the profiles in the supported profile list are of interest. For example, console application 330 may perform storage management on a chassis. In such a case, the profiles of interest may be related to a RAID profile. Console application 330 may transmit a request for the profile(s) of interest via transmission 310 to discovery module 328. Transmission 310 may also indicate if console application 330 requires an aggregated profile-based WSDL file or a profile-based WSDL file per profile. Based on the profiles of interest received from console application 330, discovery module 328 may transmit a GET_CLASS request to a Common Information Management Object Manager (CIMOM) 336 via transmission 312. The GET_CLASS requests may be transmitted one-by-one if there is more than one profile of interest. Discovery module 328 may use a CIM GET_CLASS command. For example, in some embodiments, discovery module 328 may perform a look-up in provider register 334 and then query the class information for a profile of interest. Querying the class information may include querying schema 126 (discussed with reference to FIG. 1), e.g., the CIM schema, to retrieve information about the class properties and methods. In some embodiments, discovery module 328 may use maps of provider register 334 and a CIM schema to generate the required information.

In some embodiments, CIMOM 336 may return CLASS information via return transmission 314. For example, CIMOM 336 may return the CLASS information as a CMPI binary structure. CMPI is an open standard that defines a programming interface used for systems management. Discovery module 328 may convert the CMPI binary structure into an aggregated profile-based WSDL file. Discovery module 328 may return via transmission 316 the aggregated profile-based WSDL file to console application 330. Although operation between console application 330, discovery module 128, provider register 334 and CIMOM 336 is described with reference to particular components, additional or different components may be utilized based on the particular implementation.

Figure 4:
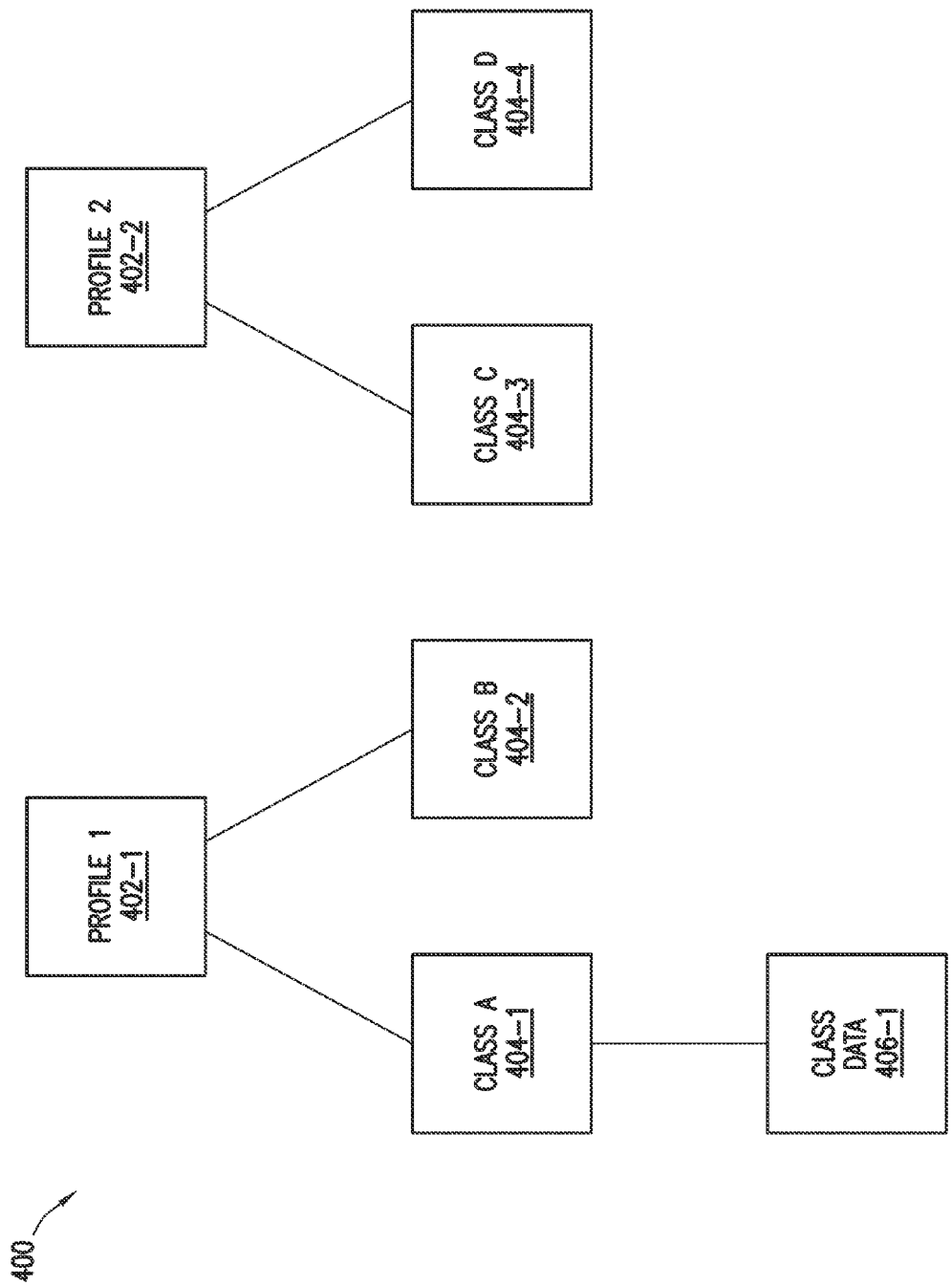
FIG. 4 illustrates an exemplary internal table data structure to generate a profile-based web services description language (WSDL) model in accordance with some embodiments of the present disclosure.

FIG. 4 illustrates an exemplary internal table data structure 400 to generate the profile-based WSDL model in accordance with some embodiments of the present disclosure. Data structure 400 may include a table structure defined by profiles 402 composed of classes 404, which in turn may include class data 406. The file containing data structure 400 may be parsed and stored in a data structure that may represent classes per provider. In operation, discovery module 328 may be configured to discover profiles and associated classes. Discovery module 328 may utilize a CMPI application programming interface (API) call, such as a GET_CLASS command to collect the class data, as discussed with reference to FIG. 3. The GET_CLASS command may also be invoked to collect the information regarding a method related to information in a class. Discovery module 328 may also include logic to retrieve the class information from CIMOM 336 using GET_CLASS commands individually. For example, the prototype of a GET_CLASS command may be represented as follows:

```
GetClass
<class>GetClass (
[IN] <className> ClassName,
[IN,OPTIONAL] boolean LocalOnly = true,
[IN,OPTIONAL] boolean IncludeQualifiers = true,
[IN,OPTIONAL] boolean IncludeClassOrigin = false,
[IN,OPTIONAL,NULL] string PropertyList [ ] = NULL )
```

In some embodiments, the CLASS element defines a single CIM class. For example, the CLASS element may be represented as follows:

```
<!ELEMENT CLASS
(QUALIFIER*,
(PROPERTY|PROPERTY.ARRAY|PROPERTY.REFERENCE)*
,METHOD*)>
<!ATTLIST CLASS
%CIMName;
%SuperClass;>
``` in which the CIMName attribute defines the name of the class, and the SuperClass attribute, if present, defines the name of the superclass of the class. If the SuperClass attribute is absent, it may be inferred that the class in question has no superclass.

The METHOD element defines a single CIM method. It may have qualifiers, and zero or more parameters. The order of the PARAMETER, PARAMETER.REFERENCE, PARAMETER.ARRAY and PARAMETER.REFARRAY subelements may not be significant. For example, the METHOD element may be represented as follows:

```
<!ELEMENT METHOD
(QUALIFIER*,
(PARAMETER|PARAMETER.REFERENCE|PARAMETER.ARRAY
|PARAMETER.REFARRAY)*)>
<!ATTLIST METHOD
%CIMName;
%CIMType; #IMPLIED
%ClassOrigin;
%Propagated;>
``` in which the CIMName attribute defines the name of the method, and the CIMType attribute defines the method return type, if the method returns a value. If the CIMType attribute is absent, the method may return no value. The QUALIFIER attribute may be IN or OUT, and represents an input or output parameter, respectively.

The PARAMETER element provides the name and type of the parameter. For example, the PARAMETER element may be represented as follows:

```
<!ELEMENT PARAMETER (QUALIFIER*)>
<!ATTLIST PARAMETER
%CIMName;
%CIMType; #REQUIRED>
```

In some embodiments, the profile-based WSDL file may be generated via an extensible markup language (XML) code set. For example, the profile-based WSDL file may generated by discovery module 328 as follows:

```
<?xml version="1.0"?>
<iDRAC_Web_Service iDRACVersion="iDRAC8" firmwareVersion="2.10.10"
otherParams="other params">
  <Dell_Profiles>
    <ResourceURIPrefix>http://schemas.dmtf.org/wbem/wscim/1/cim-
schema/2/</ResourceURIPrefix>
    <ResourceURIPrefix>http://schemas.dell.com/wbem/wscim/1/cim-
schema/2/</ResourceURIPrefix>
      <iDRACCardProfile version="1.8">
        <Classes>
          <DCIM_iDRACCardAttribute namespace="root/dcim" type="Instance">
            <SupportedOperations>
              <Enumerate />
            </SupportedOperations>
          </DCIM_iDRACCardAttribute>
          <DCIM_iDRACCardEnumeration namespace="root/dcim" type="Instance">
            <SupportedOperations>
              <Enumerate />
              <Get />
            </SupportedOperations>
          </DCIM_iDRACCardEnumeration>
          <DCIM_iDRACCardService namespace="root/dcim" type="Service">
            <SupportedOperations>
              <Enumerate />
              <Get />
              <Invoke>
                <Methods>
                  <SetAttributes>
                    <parameter name="Target" type="String"/>
                    <parameter maxOccurs="unbounded" name="AttributeName"
```

```
type="String"/>
            <parameter maxOccurs="unbounded" name="AttributeValue"
type="String"/>
          </SetAttributes>
          <ImportSSLCertificate>
            <parameter name="Target" type="String"/>
            <parameter name="RebootJobType" nillable="true"
type="UnsignedInteger"/>
            <parameter name="ScheduledStartTime" nillable="true" type="String"/>
            <parameter name="UntilTime" nillable="true" type="String"/>
          </ImportSSLCertificate>
        </Methods>
      </Invoke>
    </SupportedOperations>
  </DCIM_iDRACCardService>
  </Classes>
</iDRACCardProfile>
<PowerSupplyProfile version="x.y.z">
  <Classes>
    <DCIM_PSMemberOfCollection namespace="root/dcim" type="Association">
      <SupportedOperations>
        <Enumerate />
        <Get />
      </SupportedOperations>
    </DCIM_PSMemberOfCollection>
  </Classes>
</PowerSupplyProfile>
</Dell_Profiles>
<DMTF_Profiles>
  <ResourceURIPrefix>http://schemas.dmtf.org/wbem/wscim/1/cim-
schema/2/</ResourceURIPrefix>
</DMTF_Profiles>
</iDRAC_Web_Service>
```

In some embodiments, service processors 208 and/or 210 may operate in an offline mode. In offline mode, discovery module 328 may perform GET_CLASS calls of all the provider register components and maintain an offline database. Offline mode may reduce response times, but may necessitate maintenance of the discovery module 328 in a memory, such as memory 118 discussed with reference to FIG. 1. In this case, additional coordination may be needed if there is a provider registry or schema registry change in remote entities.

In some embodiments, service processors 208 and/or 210 may operate in a real-time mode. In real-time mode, discovery module 328 may retrieve the class data from provider register and schema when requests are made by console application 330. In this case, the response time may be slower. However, real-time mode may not include the need to update multiple databases if there is a provider registry or schema registry change in remote entities.

Modifications, additions, or omissions may be made to the systems described herein without departing from the scope of the disclosure. For example, system 200 may include any number of chassis 202, networks 204, nodes 206, and service processors 208 and 210. The components may be integrated or separated. Moreover, the operations may be performed by more, fewer, or other components. Additionally, the operations may be performed using any suitable logic comprising software, hardware, and/or other logic.

Figure 5:
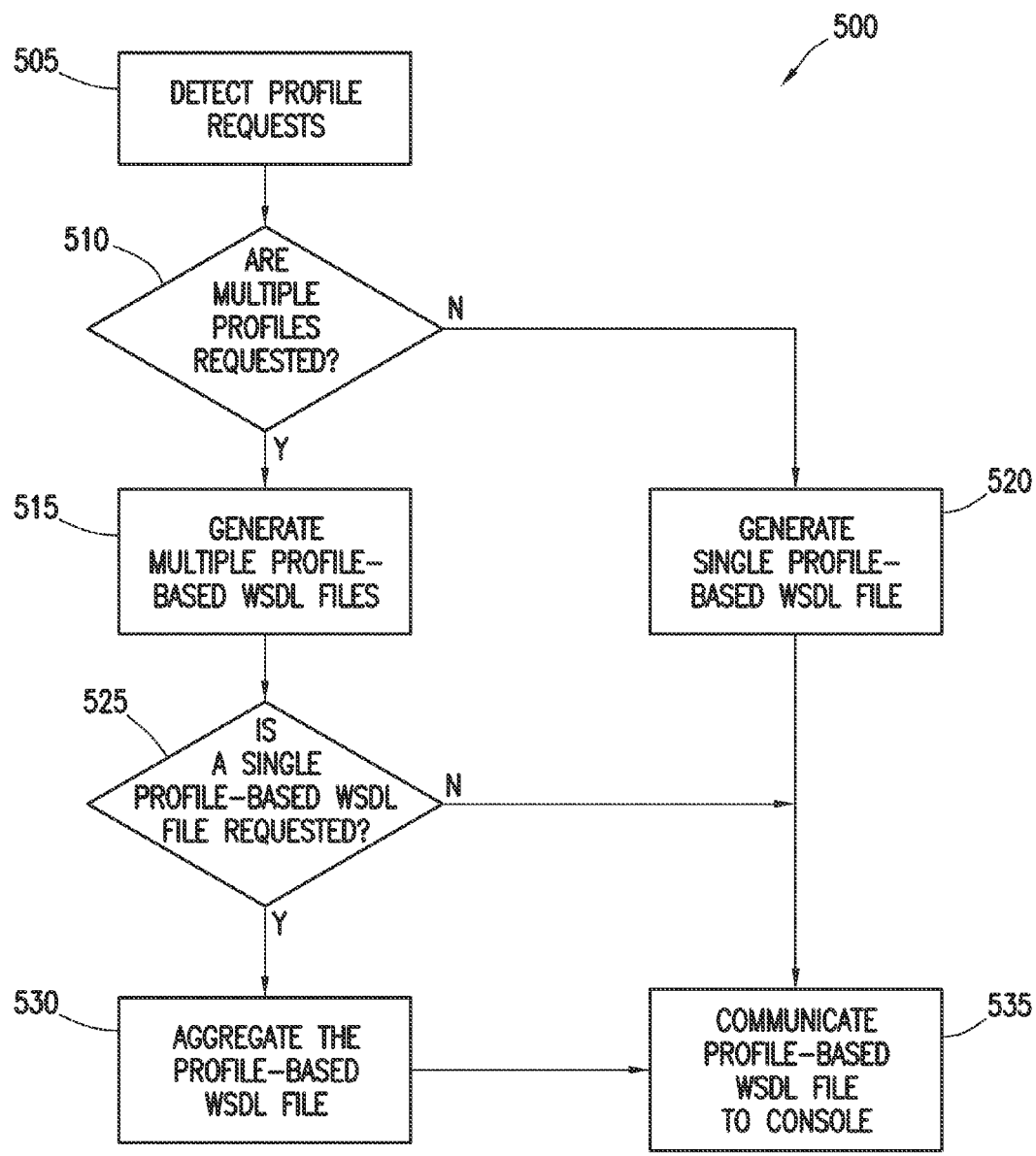
FIG. 5 illustrates a flowchart depicting selected elements of an embodiment of a method for dynamic discovery services for profiles in accordance with some embodiments of the present disclosure.

FIG. 5 illustrates a flowchart depicting selected elements of an embodiment of method 500 for dynamic discovery services for a console application in accordance with some embodiments of the present disclosure. The steps of method 500 may be performed by various computer programs, models or any combination thereof. The programs and models may include instructions stored on a non-transitory computer-readable medium that are operable to perform, when executed, one or more of the steps described below.

The computer-readable medium may include any system, apparatus or device configured to store and/or retrieve programs or instructions such as a microprocessor, a memory, a disk controller, a compact disc, flash memory or any other suitable device. The programs and models may be configured to direct a processor or other suitable unit to retrieve and/or execute the instructions from the computer-readable medium. For example, method 500 may be executed by a processor of a service processor and/or other suitable source. For illustrative purposes, method 500 may be described with respect to service processor 210 as shown in FIG. 2; however, method 500 may be used for any processor, memory, module, or any other component of an information handling system of any suitable configuration.

At step 505, the service processor detects one or more profile requests from a console application. For example, as discussed with reference to FIG. 3, discovery module 328 may receive transmission 310 with profile requests from console application 330. The profile requests may be based on profiles of interest identified by console application 330.

At step 510, the service processor determines if the received profile request is for multiple profiles. For example, if there are more than one profile of interest, method 500 may proceed to step 515. However, if only one profile is requested, method 500 may proceed to step 520.

At step 515 and step 520, the service processor generates the profile-based WSDL file or files, based on the number of profiles of interest. The discovery module may request class information for each of the profiles of interest from the profile register. For example, the profile register or discovery module may query the CIM-Schema to get the details about the profiles of interest. As such, the discovery module may utilize a GET_CLASS call to retrieve the information from the profile registers and/or CIM-Schema. Once the information is received by the discovery module, the discovery module may translate the binary information into a profile-based WSDL file.

At step 525, the service processor determines if a single aggregated profile-based WSDL file is requested. If an aggregated file is requested, method 500 may proceed to step 530. If separate profile-based WSDL files are requested, method 500 proceeds to step 535.

At step 530, the service processor aggregates the profile-based WSDL files. For example, the discovery module may bundle all of the classes, methods and associations into one file that may then be zipped for transmission. At step 535, the service processor communicates the profile-based WSDL file(s) to the requesting entity, e.g., the console application.

Modifications, additions, or omissions may be made to method 500 without departing from the scope of the present disclosure and invention. For example, the order of the steps may be performed in a different manner than that described and some steps may be performed at the same time. For example, step 525 and step 510 may be performed simultaneously. Additionally, each individual step may include additional steps without departing from the scope of the present disclosure. For example, step 520 may include additional steps or options as described herein without departing from the scope of the present disclosure.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
    detecting, at a discovery module of a service processor, a profile request from a console application;
    requesting class information for one or more classes corresponding to the detected profile request from a provider register;
    generating a profile-based web services description language (WSDL) file including the requested class information and usable by the console application to generate a management instruction;
    communicating the profile-based WSDL file to the console application; and
    receiving and implementing the management instruction generated by the console application using the profile-based WSDL file.

2. The method of claim 1, wherein requesting class information comprises querying a common information model (CIM)-Schema.

3. The method of claim 2, wherein requesting class information further comprises transmitting a GET_CLASS request to a provider register.

4. The method of claim 1, wherein the profile request comprises a request for a plurality of profiles.

5. The method of claim 4, wherein generating the profile-based WSDL file comprises generating a separate profile-based WSDL file for each of the plurality of profiles.

6. The method of claim 5, further comprising aggregating the separate profile-based WSDL files into an aggregated profile-based WSDL file.

7. The method of claim 1, wherein the profile-based WSDL file comprises information regarding a CIM profile and a CIM class corresponding to the profile request.

8. A system comprising:
    a service processor configured to:
        detect a profile request from a console application;
        request class information for one or more classes corresponding to the detected profile request from a provider register;
        generate a profile-based web services description language (WSDL) file including the requested class information and usable by the console application to generate a management instruction;
        communicate the profile-based WSDL file to the console application; and
        receive and implement the management instruction generated by the console application using the profile-based WSDL file.

9. The system of claim 8, wherein requesting class information comprises querying a common information model (CIM)-Schema.

10. The system of claim 9, wherein requesting class information further comprises transmitting a GET_CLASS request to a provider register.

11. The system of claim 8, wherein the profile request comprises a request for a plurality of profiles.

12. The system of claim 11, wherein generating the profile-based WSDL file comprises generating a separate profile-based WSDL file for each of the plurality of profiles.

13. The system of claim 12, wherein the processor is further configured to aggregate the separate profile-based WSDL files into an aggregated profile-based WSDL file.

14. The system of claim 8, wherein the profile-based WSDL file comprises information regarding a CIM profile and a CIM class corresponding to the profile request.

15. A non-transitory computer readable storage medium comprising instructions, the instructions, when executed by a processor, cause the processor to:
    detect a profile request from a console application;
    request class information for one or more classes corresponding to the detected profile request from a provider register;
    generate a profile-based web services description language (WSDL) file including the requested class information and usable by the console application to generate a management instruction;
    communicate the profile-based WSDL file to the console application; and
    receive and implement the management instruction generated by the console application using the profile-based WSDL file.

16. The medium of claim 15, wherein requesting class information comprises querying a common information model (CIM)-Schema.

17. The medium of claim 16, wherein requesting class information further comprises transmitting a GET_CLASS request to a provider register.

18. The medium of claim 15, wherein the profile request comprises a request for a plurality of profiles.

19. The medium of claim 18, wherein generating the profile-based WSDL file comprises generating a separate profile-based WSDL file for each of the plurality of profiles.

20. The medium of claim 19, wherein the processor is further caused to aggregate the separate profile-based WSDL files into an aggregated profile-based WSDL file.

* * * * *